United States Patent
Feng et al.

(10) Patent No.: US 10,055,627 B2
(45) Date of Patent: Aug. 21, 2018

(54) MOBILE IMAGING BARCODE SCANNER

(71) Applicant: Hand Held Products, Inc., Fort Mill, SC (US)

(72) Inventors: Chen Feng, Snohomish, WA (US); Tao Xian, Mt. Laurel, NJ (US); Jie Ren, Suzhou (CN); Paul Poloniewicz, Doylestown, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/296,611

(22) Filed: Oct. 18, 2016

(65) Prior Publication Data

US 2018/0101709 A1    Apr. 12, 2018

(30) Foreign Application Priority Data

Oct. 12, 2016  (CN) .......................... 2016 1 0889181

(51) Int. Cl.
*G06K 7/10* (2006.01)
*G06K 7/12* (2006.01)

(52) U.S. Cl.
CPC ..... *G06K 7/10841* (2013.01); *G06K 7/10801* (2013.01); *G06K 7/10831* (2013.01); *G06K 7/10881* (2013.01); *G06K 7/12* (2013.01)

(58) Field of Classification Search
CPC ........... G06K 7/10841; G06K 7/10831; G06K 7/10881; G06K 7/12; G06K 7/10801
See application file for complete search history.

(56) References Cited

U.S. PATENT DOCUMENTS

| | | | |
|---|---|---|---|
| 7,028,901 B2 * | 4/2006 | Carlson .............. | G06K 7/10732 235/462.04 |
| 7,510,120 B2 | 3/2009 | Reichenbach et al. | |
| 8,534,556 B2 | 9/2013 | Drzymala et al. | |
| 2006/0133757 A1 | 6/2006 | Nunnink | |

(Continued)

FOREIGN PATENT DOCUMENTS

WO    2014021025 A1    2/2014

OTHER PUBLICATIONS

Extended European Search Report in related European Application No. 17195085.0 dated Mar. 14, 2018, pp. 1-7.

*Primary Examiner* — Kristy A Haupt
(74) *Attorney, Agent, or Firm* — Additon, Higgins & Pendleton, P.A.

(57) ABSTRACT

Performance and size improvements in indicia readers are disclosed. The improvements provide for the integration of a barcode image scanner in a size restricted mobile computer device, such as a slim mobile data terminal or a smart mobile phone, and provide for the ability for the indicia reader to read direct product marking (DPM) type of barcodes. The improvements include the incorporation of an illumination module or bar that can generate dark field and bright field illumination. The illumination module can be designed to match the front end of a smart mobile phone and maintain a low profile design. Symmetric arranged multi-field, multi-color illuminator with close-up corrective lens and near coaxial aimer optics provide illumination and aiming support for the DPM scanning. The improvements allow the indicia reader, assembled in a slim mobile data terminal, to read direct product marking (DPM) type of barcodes.

19 Claims, 7 Drawing Sheets

(56) References Cited

U.S. PATENT DOCUMENTS

| | | |
|---|---|---|
| 2007/0091332 A1 | 4/2007 | Nunnink |
| 2011/0008035 A1 | 1/2011 | Messina et al. |
| 2012/0002957 A1 | 1/2012 | Pastore |
| 2016/0188934 A1* | 6/2016 | Powell ............... G06K 7/10564 235/462.42 |

* cited by examiner

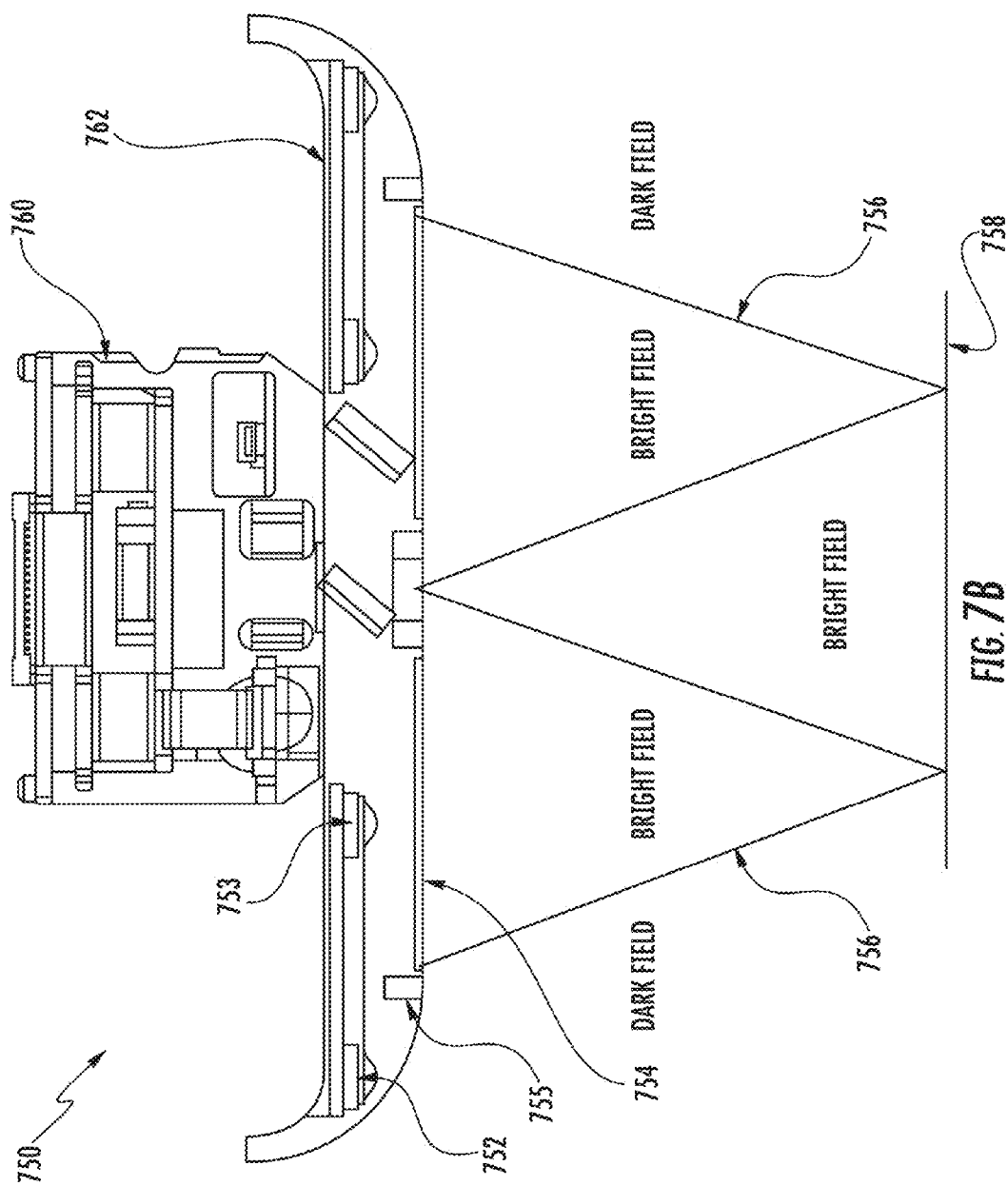

MOBILE IMAGING BARCODE SCANNER

CROSS-REFERENCE TO RELATED APPLICATION

The present application claims the benefit of Chinese Patent Application for Invention No. 201610889181.7 for a Mobile Imaging Barcode Scanner filed at the State Intellectual Property Office of the People's Republic of China on Oct. 12, 2016, which is hereby incorporated by reference in its entirety.

FIELD OF THE INVENTION

The present invention relates to the field of indicia readers, and more specifically, to improvements in illumination capability of the indicia reader for a size restricted mobile computer device to allow reading of direct product marking (DPM) barcodes.

BACKGROUND

Generally speaking mobile imaging barcode scanner with limited scanner module dimensions suffers from illumination related barcode scan difficulties. As the typical scanner illuminator has close proximity to the imaging lens, strong specular reflection can contaminate the image especially for highly reflective barcode. Direct product marking (DPM) type of barcode with metallic or laminated material are commonly adopted in the industry. For this kind of barcode application, mobile imaging barcode scanners show poor performance as compared with traditional imaging scanners. Dedicated DPM imaging scanner approaches, such as dome shape illuminator and ring shape dark field illuminator, cannot be directly applied to the mobile imaging barcode scanner due to the space requirement.

With the introduction of slim mobile data terminal types of barcode scanners there is a need to provide DPM barcode scanning solution for the front end mount imaging scanner module.

SUMMARY

Accordingly, in one aspect, the present invention embraces performance and size improvements in indicia readers that provide for the integration of a mobile image scanner in a size restricted mobile computer device, such as a slim mobile data terminal or a smart mobile phone, and provide for the ability for the indicia reader to read direct product marking (DPM) type of barcodes. The improvements include the incorporation of an illumination module or bar that can generate dark field and bright field illumination. The illumination module can be designed to match the front end of a smart mobile phone and maintain a low profile design. Symmetric arranged multi-field, multi-color illuminator with close-up corrective lens and near coaxial aimer optics provide illumination and aiming support for the DPM scanning. The improvements allow the indicia reader, assembled in a slim mobile data terminal, to read direct product marking (DPM) type of barcodes.

In an exemplary embodiment, an indicia-reading apparatus (e.g., an indicia-reading module) can comprise an illumination module, that provides dark field illumination and bright field illumination, and an image scanner module. The illumination module is proximate to the image scanner module and integrated in a mobile computer device. The illuminated module can be mounted to the image scanner module.

The illumination module can comprise a first and a second dark field multi-color LED (e.g., a tri-color LED) and a first and second bright field multi-color LED (e.g., a tri-color LED); a first and a second end dark field light block; a close-up corrective lens; an first and second diffuser. The first dark field multi-color LED and the first end dark field light block are proximate to one end of the illumination module, and the second dark field multi-color LED and the second end dark field light block are proximate to another end of the illumination module.

The first and the second bright field multi-color LED are each: 1) proximate to a center of the illumination module and adjacent to a close-up corrective lens that is positioned in the center of the illumination module, and 2) proximate to a diffuser that diffuses light emitted by the first and the second bright field multi-color LED.

A first and a second dark field multi-color LED (e.g., a tri-color LED) and the first and the second dark field multi-color LED (e.g., a tri-color LED) can provide a high incident angle light for the dark field illumination to prevent specular reflection entering an imaging lens field of view. The first and second bright field multi-color LED and the first and second diffuser provide a low incident angle light with large area diffuser to minimized specular reflection disturbance in a bright field illumination.

The close-up corrective lens can provide imaging for near range reading. The illumination module can further comprise two aimer mirrors in proximity to the close-up corrective lens to provide a near-coaxial aimer for providing code alignment. The dark field multi-color LED and the bright field multi-color LED can be programmable to achieve the best contrast with the best illumination spectrum for specific object.

The first dark field multi-color LED and the first bright field multi-color LED are mounted on a first LED module, and the second dark field multi-color LED and the second bright field multi-color LED can be mounted on a second LED module, and wherein, the first LED module can be mounted on one side of the illumination module and the second LED module can be mounted on an other side of the illumination module, with the close-up corrective lens positioned between the first and second LED module.

In another exemplary embodiment, an illumination module can comprise a first and a second dark field multi-color LED for illuminating dark fields; a first and a second end dark field light blocks. The first and the second dark field multi-color LED provide high incidence angle dark field illumination to prevent specular reflection entering an imaging lens field of view. The first and the second end dark field light block reduce illumination and reflection in the illumination module. The illumination and reflections can be unwanted illumination and reflections.

The illumination module can further comprise a first and a second bright field multi-color LED (e.g., tri-color LEDs) for illuminating bright fields; a first and second diffuser that are positioned to diffuse the light emitted from the first and the second bright field multi-color LED, respectively; and a close-up corrective lens that is positioned in the center of illumination module, between the first and the second bright field multi-color LED. The first and the second bright field multi-color LED, provide a low incident angle light and the first and the second diffuser to minimized specular reflection disturbance in a bright field illumination. That is, the first and second diffuser diffuses the bright field illumination.

The illumination module can further comprise two aimer mirrors in proximity to the close-up corrective lens to provide a near-coaxial aimer for providing code alignment. The illumination module is proximate to an image scanner module. The illumination module and image scanner module are integrated in a smart mobile phone. Imaging scanning includes scanning direct product marking (DPM) type barcodes.

In yet another exemplary embodiment, a mobile data terminal can comprise an illumination module that provides dark field illumination and bright field illumination; an image scanner module, and a smart mobile phone. The illumination module can be proximate to the image scanner module and can be integrated in a smart mobile phone. The integration of the illumination module and the image scanner module supports thin mobile phone edge mount applications The illumination module can comprise: a clear bezel to mechanically support the components as well as optically support illumination, aimer and lens functions, two multi-color LEDs (e.g., tri-color LEDs) that provide edge illumination sources for dark field illumination, two multi-color LEDs (e.g., tri-color LEDs) that provide front illumination sources for bright field illumination, two light diffuser to improve uniformity of the front illumination, two aimer fold mirrors to redirect an aimer beam, and a corrective imaging lens for close-up reading.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 7B illustrates an exemplary embodiment of the dark field and bright field illumination of the indicia-reading module.

DETAILED DESCRIPTION

Figure 1:
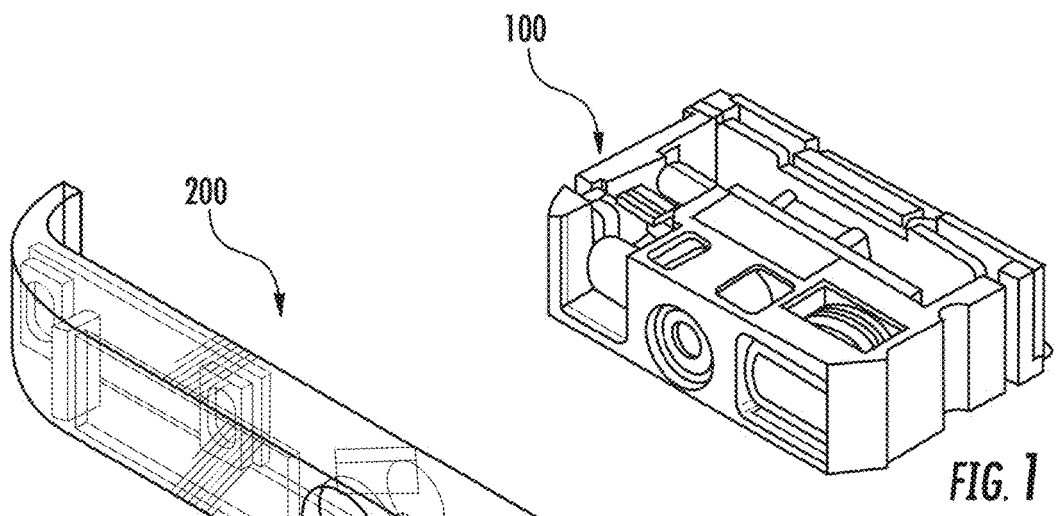
FIG. 1 illustrates an exemplary embodiment of an image scanner module.

Accordingly, in one aspect, the present invention embraces improvements in indicia readers that 1) provide for the integration of a mobile image scanner in a size restricted mobile computer device, such as a slim mobile data terminal or a smart mobile phone, and 2) provide for the ability for the indicia reader to read direct product marking (DPM) type of barcodes. The improvements include the incorporation of an illumination module or bar that can generate dark field and bright field illumination. The illumination module can be designed to match the front end of a smart mobile phone and maintain a low profile design. Symmetric arranged multi-field, multi-color illuminator with close-up corrective lens and near coaxial aimer optics provide illumination and aiming support for the DPM scanning. The improvements allow the indicia reader, assembled in a slim mobile data terminal, to read direct product marking (DPM) type of barcodes.

As previously discussed, the typical scanner module illuminator, having close proximity to an imaging lens, can generate a strong specular reflection that can contaminate the image especially for highly reflective barcode such as direct product marking (DPM) type of barcode with metallic or laminated material. For this kind of barcode application, typical mobile imaging barcode scanners show poor performance than traditional imaging scanners. Dedicated DPM imaging scanner approaches cannot be directly applied to the mobile imaging barcode scanner due to the space requirement.

A barcode reader (or barcode scanner) can be an electronic device that can read and output the data of a printed barcodes to a computer. It can include of a light source, a lens, and a light sensor translating optical impulses into electrical pulses. Barcode readers can contain decoder circuitry that analyzes the barcode's image data provided by the sensor and sends the barcode's content to the scanner's output port.

A barcode can be used to encode information in a visual pattern readable by a machine. Barcodes can be used for a variety of reasons including tracking products, prices, and stock levels for centralized recording in a computer software system. There are two types of barcodes—linear and 2D.

Most barcode scanners can include three different parts: the illumination system, the sensor, and the decoder. In general, a barcode scanner "scans" black and white elements of a barcode by illuminating the code with a light, which is then converted into matching text. More specifically, the sensor in the barcode scanner can detect the reflected light from the illumination system and generate a sensor stream reflecting the captured image of the barcode. The sensor stream is sent to the decoder. The decoder processes the frames of the sensor stream, validates the barcode, and coverts it into text. This converted text can be delivered by the scanner to a computer software system holding a database of the maker, cost, and quantity of products sold.

Direct Part Marking (DPM)

DPM barcode scanners and mobile computers are equipped with imagers capable of reading barcodes that are etched or imprinted directly into the surface of materials such as plastic and metal.

DPM tags are in essence Datamatrix (or QR) symbols directly marked onto a substrate (metal, rubber, glass, etc.). There are many marking technologies to choose from (e.g. mechanical drilling/hammering/laser etching/chemical etching/sand-blasting/mold casting/stenciling etc.) depending on substrate type, cost, and the level of durability that can be desired. Unlike paper-based barcodes (i.e. printed on plain paper and usually printed with black ink/thermal on white backgrounds) DPM barcodes can be tricky to scan, for several reasons including reflectance from the substrate and lack of contrast between the actual marks and the said substrate. Often times these marks can even appear completely "washed-out" to the casual observer. Another peculiarity of DPM barcodes is that the barcode can be made of an assortment of dots which can be clearly non-contiguous with each other, or be overlapped to some degree; these marks are usually referred to as "dot-peen" when made of recessed circular dots.

As defined herein, a slim mobile data terminal is a mobile imaging barcode scanner that has the approximate shape of a slim smart mobile phone. With the improvements discussed herein, the slim mobile data terminal can provide DPM barcode scanning. The slim mobile data terminal can include an illumination module or bar integrated with a front end mount imaging scanner module. The illumination bar can be mounted to fit into a thin mobile phone edge mount application. The illumination bar matches the profile of the front of the smart mobile phone and provides a number of illumination incident angle options. The illumination module can effectively replace existing front enclosure wall of the smart mobile phone assembly structure inasmuch as the width and height of the illumination bar can be the same as the slim mobile data terminal The dimensions of smart mobile phones in the market place can range as follows: edge thickness from approximately 5 mm to 8 mm, and widths from approximately 58 mm to 77 mm. Smart mobile phone with dimension in this range can support thin mobile phone edge mount application, and may be referred to as slim mobile data terminal. The present invention can be implemented in smart mobile phones with the aforementioned range of dimensions. However, the application of the present invention is not limited to phones/terminals with the aforementioned range of dimensions.

The width of the illumination module assembly can comprise two illumination sources positioned at the end of the illumination module that can provide high incident angle light for dark field illumination to prevent specular reflection entering the imaging lens field of view. In the middle portion of the illumination module there can be another two illumination sources that can provide low incident angle light that is diffused with large area diffuser to minimized specular reflection disturbance in the bright field illumination.

Further improvements to the slim mobile data terminal can be achieved by adding a close-up corrective lens to the illumination module to reduce the best focus object distance. The aimer pattern beam for visual alignment can also be bent very close to the imaging lens axis to minimize the off-set between aimer pattern the true effective field of view.

Other further improvements include some additional light treatments to eliminate stray light by adding light blocks to reduce unwanted illumination and reflection in the illumination module.

The illumination module can be designed to match the front end of a smart mobile phone and keep the low profile design. Symmetric arranged multi-field, multi-color illuminator with close-up corrective lens and near coaxial aimer optics provide illumination and aiming support for the DPM scanning.

The illumination module can include a clear polycarbonate bezel to mechanically support the components as well as optically support illumination, aimer and lens functions, 2 PCB's with 4 tri-color LED's that provide edge and front illumination sources, 2 light diffuser to improve uniformity of the front illumination, a pair of aimer fold mirrors to redirect the aimer beam, and the corrective imaging lens for close up reading.

In summary, the illumination module can provide the following:
1. Two end high incidence light sources for dark field illumination without any specular reflections.
2. Two area diffused front light source for bright field illumination with low specular reflections.
3. The dark field illumination and bright field illumination can be provided by programmable tri-color light source for the best contrast of the image. The tri-color LEDS can be individually activated to support various applications and options with illumination direction and spectrum selection.
4. Via a close up corrective imaging lens, an optical correction can provide the best focus distance for a small size DPM reading.
5. A pair of aimer fold mirrors that redirects the aimer beam so that it is close to the imagine lens line of sight, in order to minimize the aiming error of the small size DPM code.

In an exemplary embodiment, FIG. 1 illustrates image scanner module 100. Image scanner module 100 can be referred to as a front-end mount imaging scanner module.

Figure 2:
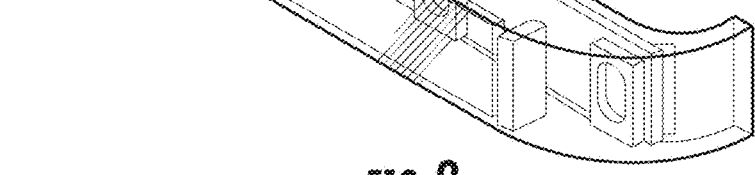
FIG. 2 illustrates an exemplary embodiment of an illumination module.

In an exemplary embodiment, FIG. 2 illustrates illumination module 200. Illumination module 200 can be referred to an illumination bar based on the shape of illumination module 200

Figure 3:
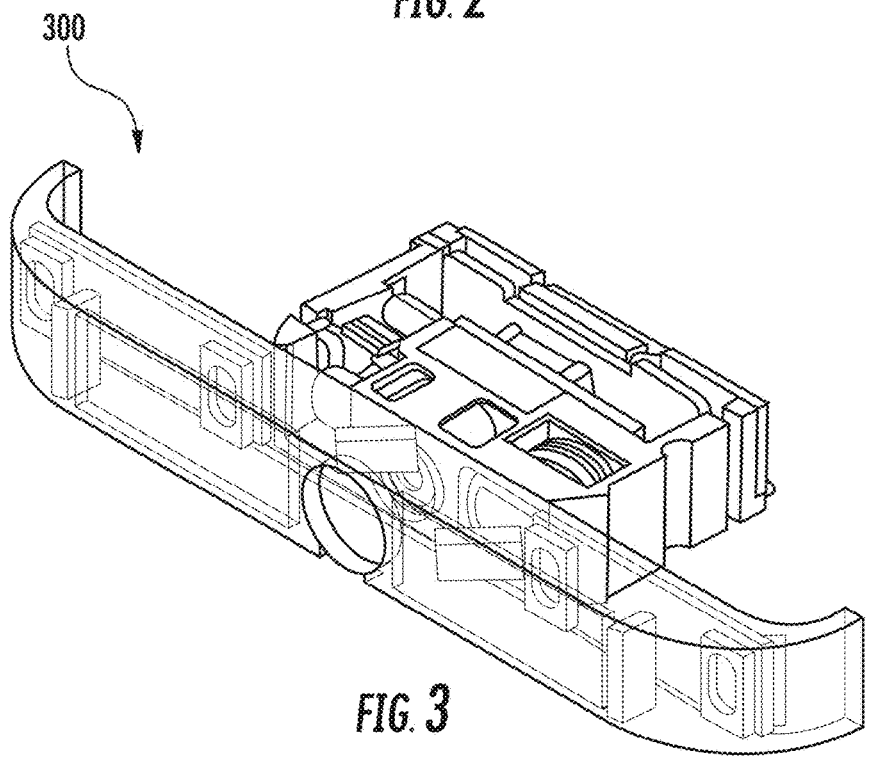
FIG. 3 illustrates an exemplary embodiment of an indicia-reading module comprising the integration of the image scanner module and the illumination module.

In an exemplary embodiment, FIG. 3 illustrates indicia-reading module 300 comprising the integration of the image scanner module 100 and the illumination module 200.

Figure 4:
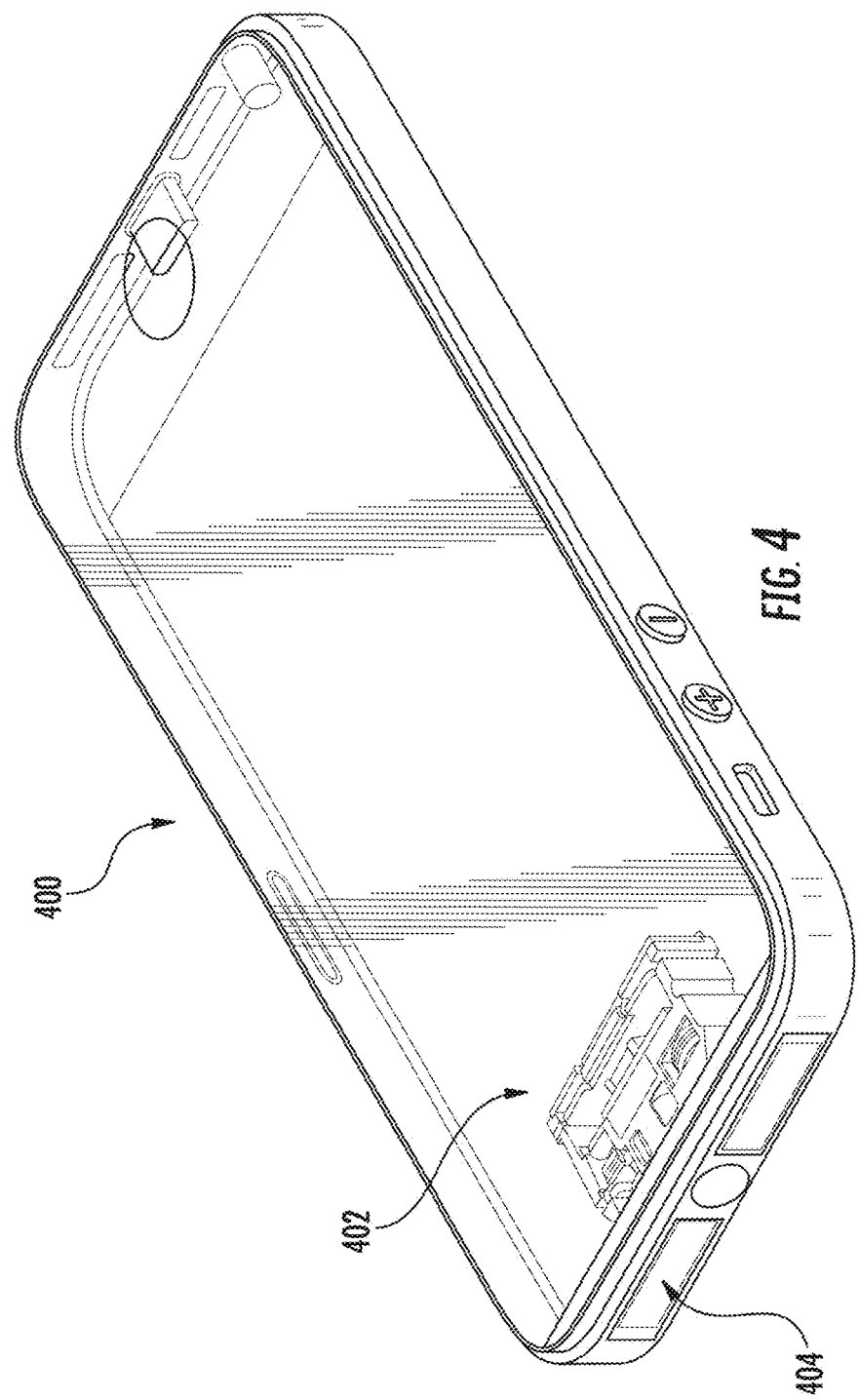
FIG. 4 illustrates an exemplary embodiment of the indicia-reading module integrated in a case of a slim mobile data terminal or smart mobile phone.

In an exemplary embodiment, FIG. 4 illustrates a slim mobile data terminal 400 comprising indicia-reading module 404 integrated in the case 402 of the slim mobile data terminal 400. Case 402 can have a thin mobile phone edge mount structure. As illustrated, the front of the indicia-reading module 404 fits into the front of the slim mobile data terminal 400. Slim mobile data terminal 400 can support DPM barcode scanning.

Figure 5:
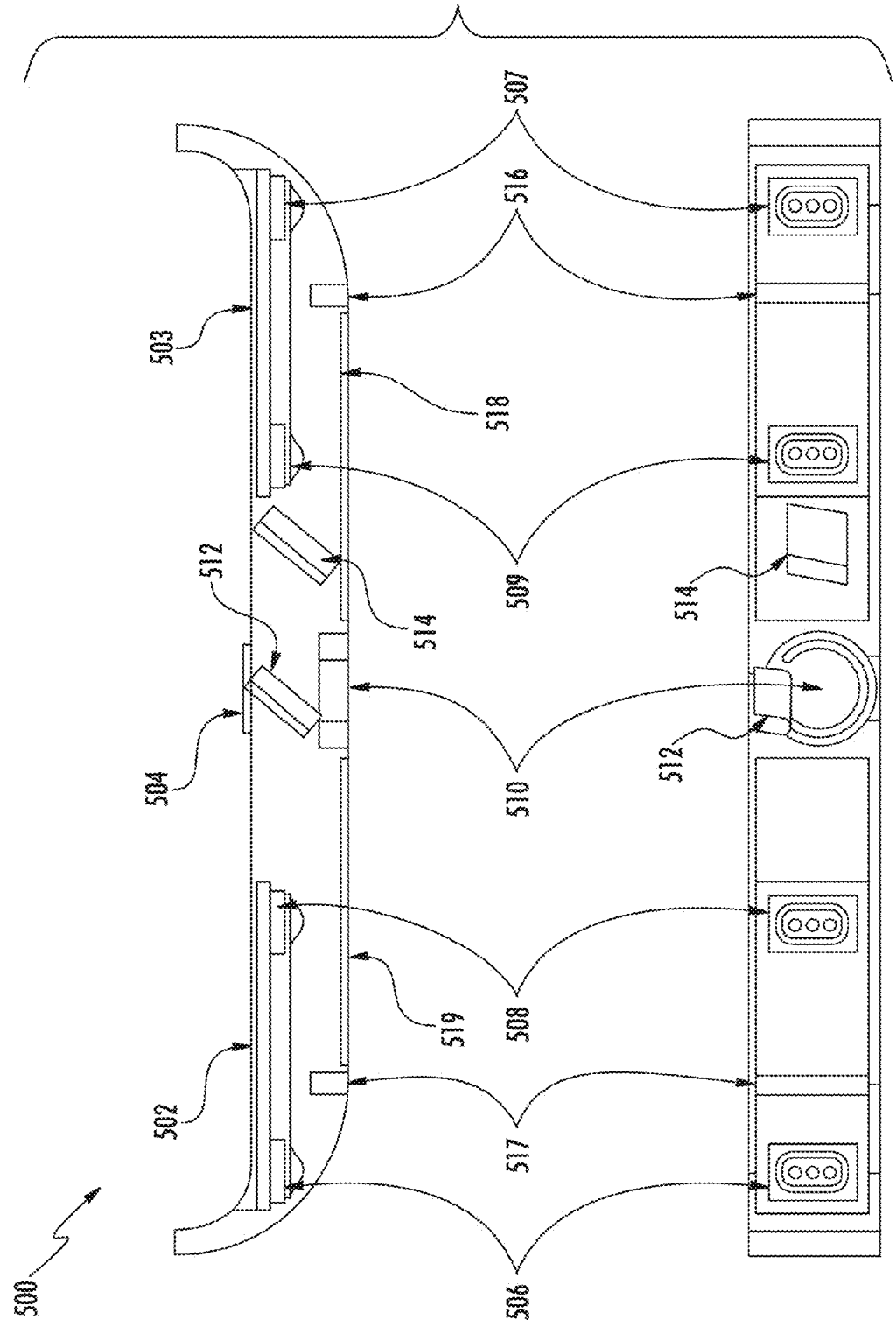
FIG. 5 illustrates an exemplary embodiment of a horizontal and vertical view of the illumination module.

FIG. 5 illustrates a horizontal and vertical view 500 of illumination module 200. FIG. 5 illustrates: a first and second LED module 502 and 503, respectively; a slim imager lens bore fitting (boss) 504; a first and second LED for end dark light illumination, 506 and 507, respectively; a first and second color LED for front bright light illumination, 508 and 509, respectively; a close-up corrective lens 510; a first and second near-coaxial aimer beam fold mirrors, 512 and 514, respectively; a first and second end dark field light block, 516 and 517, respectively; a first and second diffuser, 518 and 519, respectively.

The close-up corrective lens 510 is an imaging lens. The slim imager lens bore fitting 504 is positioned with precise alignment. The plurality of LEDs can be tri-color LEDs. Tri-color LEDs can be programmable and can provide improved contrast compared with traditional mobile scanners. The LED modules can be circuit boards.

Figure 6:
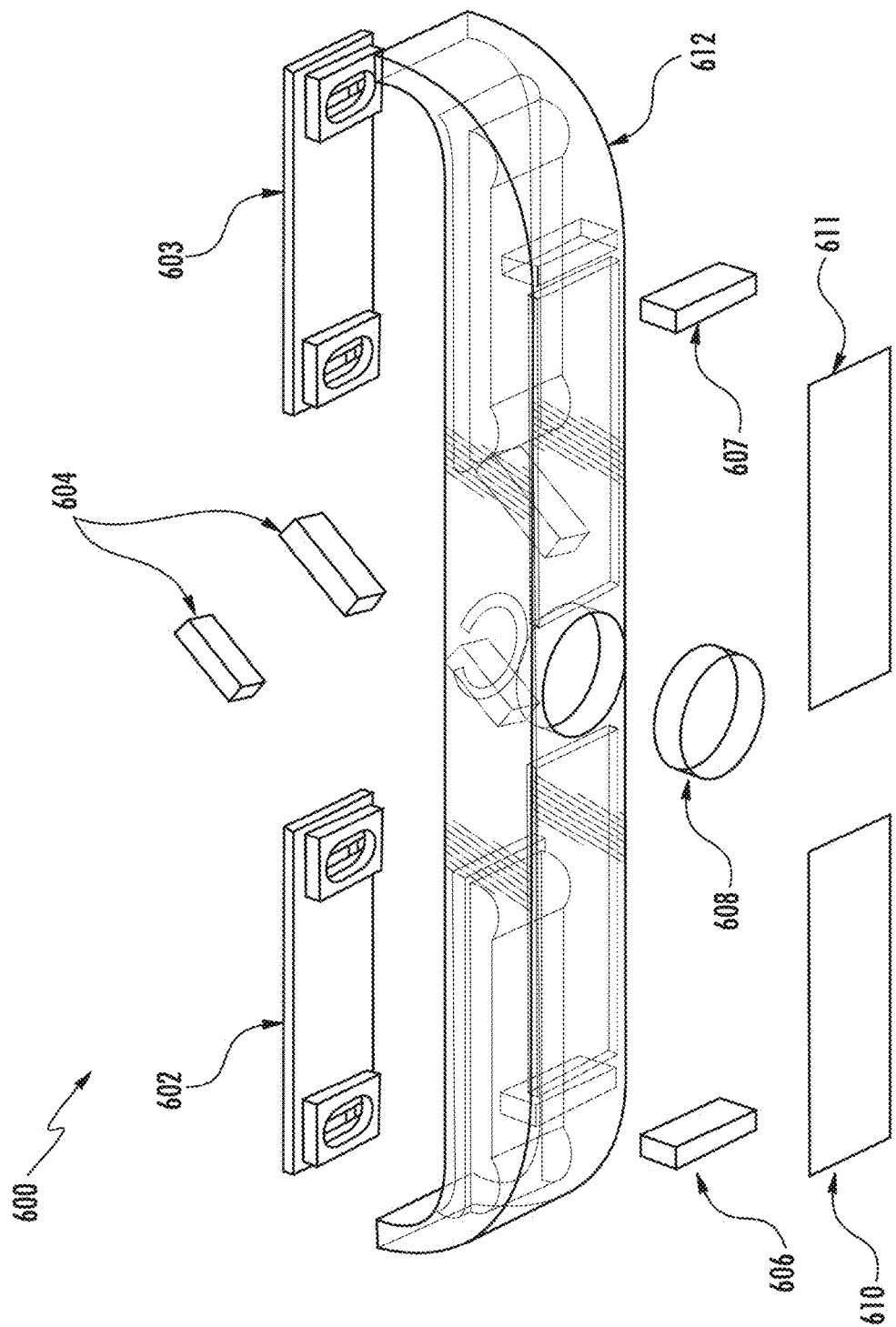
FIG. 6 illustrates an exemplary embodiment of a partially disassembled view of the illumination module.

In an exemplary embodiment, FIG. 6 illustrates a partially disassembled view 600 of the illumination module 200. FIG. 6 illustrates: a first and second LED module, 602 and 603, respectively; two near-coaxial aimer beam fold mirrors, 604; a first and second end dark field light block, 606 and 607, respectively; a close-up corrective lens 608; a first and second diffuser, 610 and 611, respectively. The close-up corrective lens 608 can provide for near range reading. The illumination module can comprise an optically clear bezel 612. The component described herein can fit into the optically clear bezel 612.

Bright field illumination is commonly used in optics. In this mode, light directly striking the surface is reflected based on the sample's composition and topography.

Dark field illumination is a tool for viewing particles, edges, or other changes occurring on a sample's surface. With this process, the center of the light cone can be blocked allowing only light scattering along the surface at a high incident angle to illuminate the field of view.

Figure 7A:
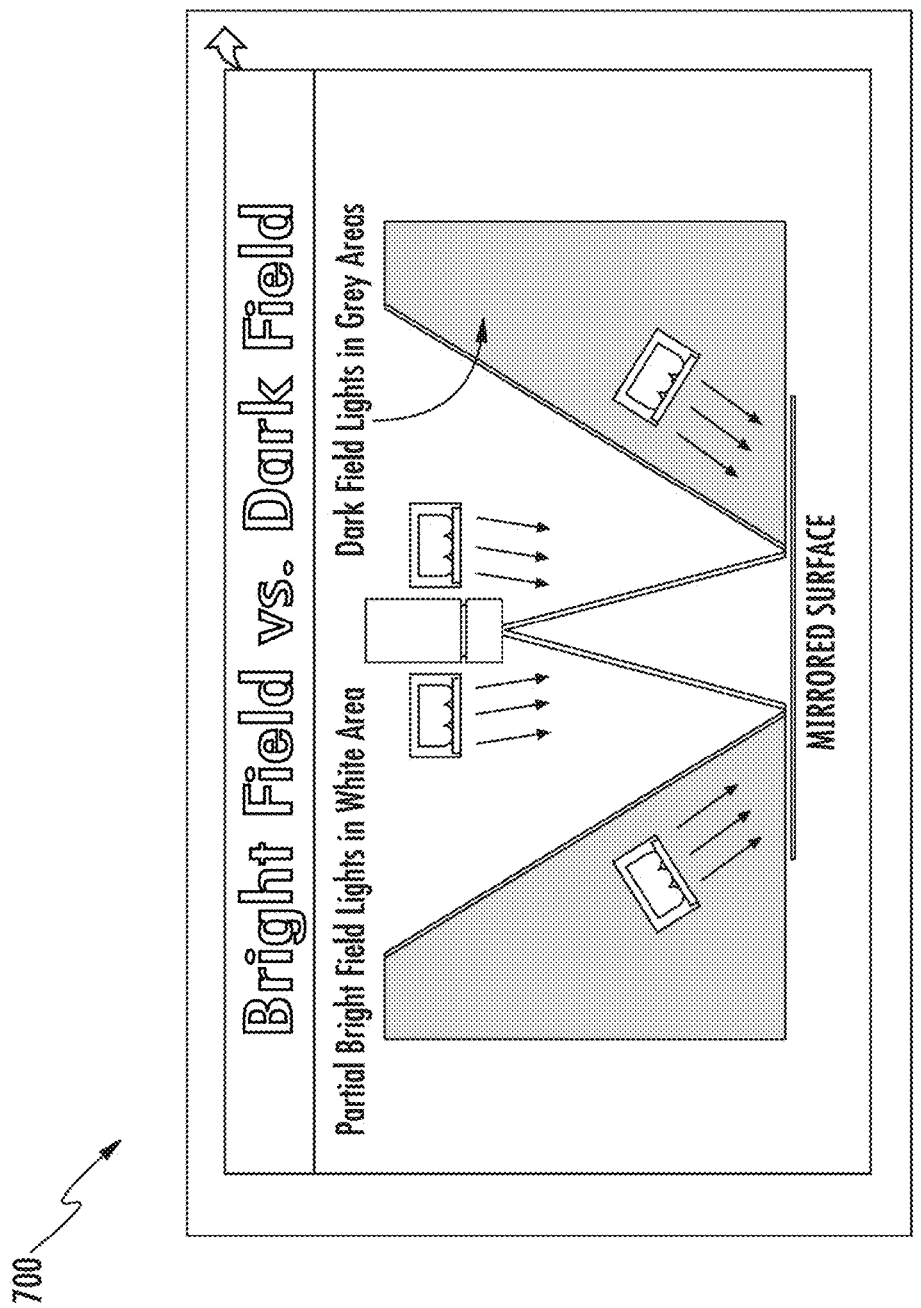
FIG. 7A illustrates dark field and bright field illumination.

FIG. 7A, embodiment 700, illustrates the relationships between a dark field and a bright field. Light reflections are based on the principle that the angle of incidence equals the angle of reflection. FIG. 7A illustrates dark field that is generated by dark field lights in the grey areas, and bright field that is generated by bright field lights in the white areas. When imaging from a mirrored surface, the presence of light in bright field on a shiny surface will be viewed from camera. The presence of lighting in dark field will not be viewed from camera.

As shown in FIG. 7A, a bright field light source emits beams of light that can have a low incident angle relative to the field of view. As illustrated, the field of view is a mirrored surface. The subsequent reflection generates a bright field that is viewed by the camera.

A dark field light source emits beams of light that can have a high incident angle relative to the field of view. The subsequent reflection does not appear in the bright field area. Rather, the dark field light source can generate dark fields.

The collection of light sources having a low incident angle relative to the field of view and light sources having a high incident angle relative to the field of view a "W" in illumination geometry, as illustrated in FIG. 7A. At a critical incident angle relative to the field of view, a border between the dark field and bright field is created. The areas that are outside of the "W" are a dark field, and the areas that are inside the "W" are a bright field.

Effective application of dark field lighting relies on the fact that much of the light incident on a mirrored surface in the field of view, that would otherwise flood the scene as a hot spot glare, is reflected away from, rather than toward a close-up corrective lens. The relatively small amount of light that is reflected back into the camera is what happens to catch an edge of a small feature on the surface, satisfying the "angle of reflection equals the angle of incidence" equation.

In an exemplary embodiment, FIG. 7B illustrates dark field and bright field illumination of indicia-reading module 750. Indicia-reading module 750 can comprise image scanner module 760 and illumination module 762. LED 752 can be the source of the dark field illumination. LED 753 can be the source of the bright field illumination. End dark field light block 755 can eliminate undesired illumination and reflection in the illumination module. The diffuser 754 diffuses the light from LED 753. The collective pattern resulting from the dark field illumination and the bright field illumination is illustrated by the dark field boundary 756. The result can be distinctive areas of dark field and bright field illumination.

Figure 8:
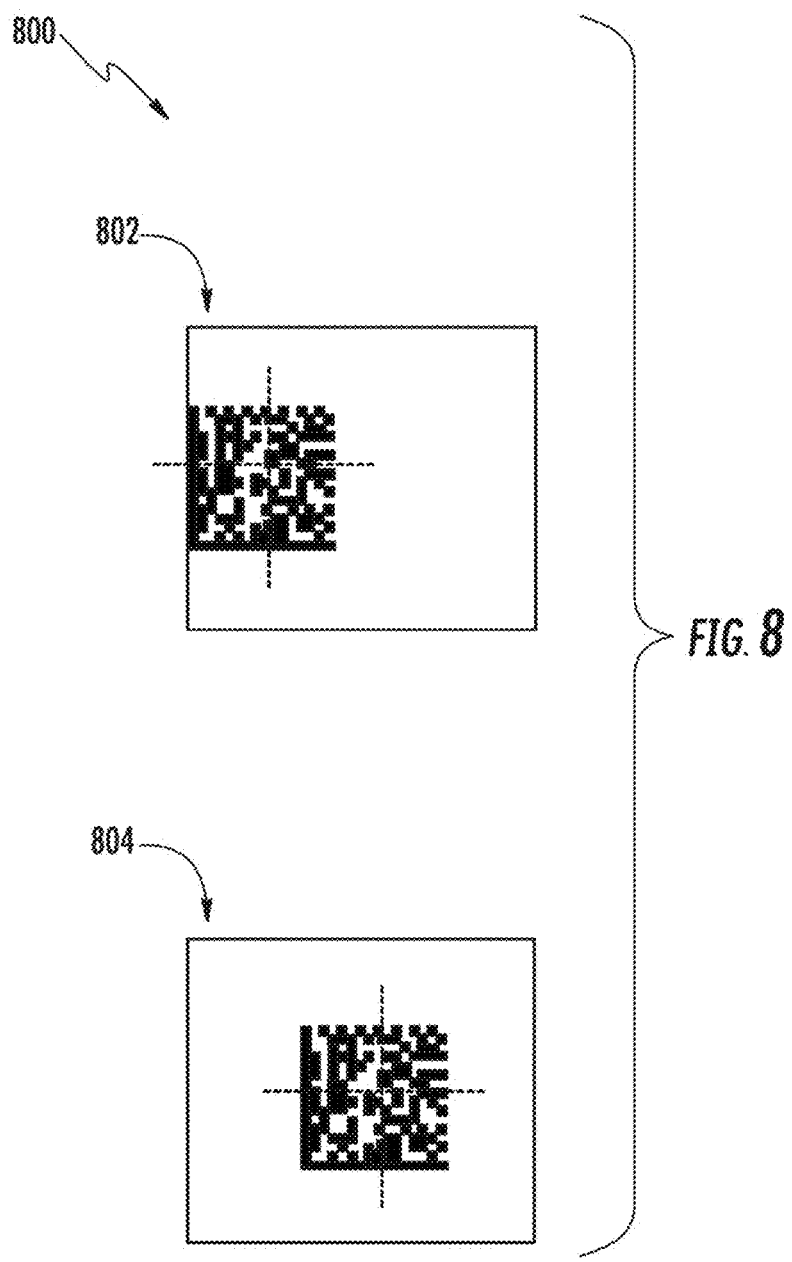
FIG. 8 illustrates an improvement in aiming accuracy provided by an exemplary embodiment of near-coaxial aimer beam fold mirrors in proximity to a close-up corrective lens.

In an exemplary embodiment, FIG. 8 illustrates improvement in aiming accuracy provided by an exemplary embodiment of two near-coaxial aimer beam fold mirrors in proximity to a close-up corrective lens. FIG. 8, aimer pattern 802 illustrates an aimer pattern that is not in the center of the image field of view. The slim imager aimer can have an off-set that can create alignment errors, causing scanning errors. The near-coaxial aimer beam fold mirrors can effectively create a periscope. Accordingly, the aimer pattern can be re-directed to provide better alignment, per FIG. 8, aimer pattern 804. The close-up corrective lens 608 provides further improvement by shifting the best focus distance closer to the image.

The illumination module 200 can provide:
Two-end high incidence angle dark field illumination
Two-area diffused front bright field illumination
Close-up corrective lens for near range reading
Near-coaxial aimer for better small code alignment
Programmable tri-color illumination for the best contrast [may use this language for claim 20, or delete]

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; D702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D733,112; U.S. Design Pat. No. D734,339; International Publication No. 2013/163789; International Publication No. 2013/173985; International Publication No. 2014/019130; International Publication No. 2014/110495; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No.

2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0287258; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0313325; U.S. Patent Application Publication No. 2013/0342717; U.S. Patent Application Publication No. 2014/0001267; U.S. Patent Application Publication No. 2014/0008439; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0042814; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0078341; U.S. Patent Application Publication No. 2014/0078345; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0104451; U.S. Patent Application Publication No. 2014/0106594; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0114530; U.S. Patent Application Publication No. 2014/0124577; U.S. Patent Application Publication No. 2014/0124579; U.S. Patent Application Publication No. 2014/0125842; U.S. Patent Application Publication No. 2014/0125853; U.S. Patent Application Publication No. 2014/0125999; U.S. Patent Application Publication No. 2014/0129378; U.S. Patent Application Publication No. 2014/0131438; U.S. Patent Application Publication No. 2014/0131441; U.S. Patent Application Publication No. 2014/0131443; U.S. Patent Application Publication No. 2014/0131444; U.S. Patent Application Publication No. 2014/0131445; U.S. Patent Application Publication No. 2014/0131448; U.S. Patent Application Publication No. 2014/0133379; U.S. Patent Application Publication No. 2014/0136208; U.S. Patent Application Publication No. 2014/0140585; U.S. Patent Application Publication No. 2014/0151453; U.S. Patent Application Publication No. 2014/0152882; U.S. Patent Application Publication No. 2014/0158770; U.S. Patent Application Publication No. 2014/0159869; U.S. Patent Application Publication No. 2014/0166755; U.S. Patent Application Publication No. 2014/0166759; U.S. Patent Application Publication No. 2014/0168787; U.S. Patent Application Publication No. 2014/0175165; U.S. Patent Application Publication No. 2014/0175172; U.S. Patent Application Publication No. 2014/0191644; U.S. Patent Application Publication No. 2014/0191913; U.S. Patent Application Publication No. 2014/0197238; U.S. Patent Application Publication No. 2014/0197239; U.S. Patent Application Publication No. 2014/0197304; U.S. Patent Application Publication No. 2014/0214631; U.S. Patent Application Publication No. 2014/0217166; U.S. Patent Application Publication No. 2014/0217180; U.S. Patent Application Publication No. 2014/0231500; U.S. Patent Application Publication No. 2014/0232930; U.S. Patent Application Publication No. 2014/0247315; U.S. Patent Application Publication No. 2014/0263493; U.S. Patent Application Publication No. 2014/0263645; U.S. Patent Application Publication No. 2014/0267609; U.S. Patent Application Publication No. 2014/0270196; U.S. Patent Application Publication No. 2014/0270229; U.S. Patent Application Publication No. 2014/0278387; U.S. Patent Application Publication No. 2014/0278391; U.S. Patent Application Publication No. 2014/0282210; U.S. Patent Application Publication No. 2014/0284384; U.S. Patent Application Publication No. 2014/0288933; U.S. Patent Application Publication No. 2014/0297058; U.S. Patent Application Publication No. 2014/0299665; U.S. Patent Application Publication No. 2014/0312121; U.S. Patent Application Publication No. 2014/0319220; U.S. Patent Application Publication No. 2014/0319221; U.S. Patent Application Publication No. 2014/0326787; U.S. Patent Application Publication No. 2014/0332590; U.S. Patent Application Publication No. 2014/0344943; U.S. Patent Application Publication No. 2014/0346233; U.S. Patent Application Publication No. 2014/0351317; U.S. Patent Application Publication No. 2014/0353373; U.S. Patent Application Publication No. 2014/0361073; U.S. Patent Application Publication No. 2014/0361082; U.S. Patent Application Publication No. 2014/0362184; U.S. Patent Application Publication No. 2014/0363015; U.S. Patent Application Publication No. 2014/0369511; U.S. Patent Application Publication No. 2014/0374483; U.S. Patent Application Publication No. 2014/0374485; U.S. Patent Application Publication No. 2015/0001301; U.S. Patent Application Publication No. 2015/0001304; U.S. Patent Application Publication No. 2015/0003673; U.S. Patent Application Publication No. 2015/0009338; U.S. Patent Application Publication No. 2015/0009610; U.S. Patent Application Publication No. 2015/0014416; U.S. Patent Application Publication No. 2015/0021397; U.S. Patent Application Publication No. 2015/0028102; U.S. Patent Application Publication No. 2015/0028103; U.S. Patent Application Publication No. 2015/0028104; U.S. Patent Application Publication No. 2015/0029002; U.S. Patent Application Publication No. 2015/0032709; U.S. Patent Application Publication No. 2015/0039309; U.S. Patent Application Publication No. 2015/0039878; U.S. Patent Application Publication No.

2015/0040378; U.S. Patent Application Publication No.
2015/0048168; U.S. Patent Application Publication No.
2015/0049347; U.S. Patent Application Publication No.
2015/0051992; U.S. Patent Application Publication No.
2015/0053766; U.S. Patent Application Publication No.
2015/0053768; U.S. Patent Application Publication No.
2015/0053769; U.S. Patent Application Publication No.
2015/0060544; U.S. Patent Application Publication No.
2015/0062366; U.S. Patent Application Publication No.
2015/0063215; U.S. Patent Application Publication No.
2015/0063676; U.S. Patent Application Publication No.
2015/0069130; U.S. Patent Application Publication No.
2015/0071819; U.S. Patent Application Publication No.
2015/0083800; U.S. Patent Application Publication No.
2015/0086114; U.S. Patent Application Publication No.
2015/0088522; U.S. Patent Application Publication No.
2015/0096872; U.S. Patent Application Publication No.
2015/0099557; U.S. Patent Application Publication No.
2015/0100196; U.S. Patent Application Publication No.
2015/0102109; U.S. Patent Application Publication No.
2015/0115035; U.S. Patent Application Publication No.
2015/0127791; U.S. Patent Application Publication No.
2015/0128116; U.S. Patent Application Publication No.
2015/0129659; U.S. Patent Application Publication No.
2015/0133047; U.S. Patent Application Publication No.
2015/0134470; U.S. Patent Application Publication No.
2015/0136851; U.S. Patent Application Publication No.
2015/0136854; U.S. Patent Application Publication No.
2015/0142492; U.S. Patent Application Publication No.
2015/0144692; U.S. Patent Application Publication No.
2015/0144698; U.S. Patent Application Publication No.
2015/0144701; U.S. Patent Application Publication No.
2015/0149946; U.S. Patent Application Publication No.
2015/0161429; U.S. Patent Application Publication No.
2015/0169925; U.S. Patent Application Publication No.
2015/0169929; U.S. Patent Application Publication No.
2015/0178523; U.S. Patent Application Publication No.
2015/0178534; U.S. Patent Application Publication No.
2015/0178535; U.S. Patent Application Publication No.
2015/0178536; U.S. Patent Application Publication No.
2015/0178537; U.S. Patent Application Publication No.
2015/0181093; U.S. Patent Application Publication No.
2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. An indicia-reading apparatus, comprising:
   an illumination module that provides dark field illumination and bright field illumination; and
   an image scanner module;
   wherein, the illumination module comprises:
      a first and a second dark field multi-color LED and a first and second bright field multi-color LED; and a close-up corrective lens, the first dark field multi-color LED and the first bright field multi-color LED mounted on a first LED module, and the second dark field multi-color LED and the second bright field multi-color LED mounted on a second LED module, and wherein, the first LED module is mounted on one side of the illumination module and the second LED module is mounted on an other side of the illumination module, with the close-up corrective lens positioned between the first and second LED module, and wherein, the illumination module is proximate to the image scanner module and they are integrated in a mobile computer device.

2. The indicia-reading apparatus according to claim 1, wherein, the illumination module further comprises:
a first and a second end dark field light block; and
a first and second diffuser.

3. The indicia-reading apparatus according to claim 2, wherein,
the first dark field multi-color LED and the first end dark field light block are proximate to one end of the illumination module, and the second dark field multi-color LED and the second end dark field light block are proximate to another end of the illumination module.

4. The indicia-reading apparatus according to claim 2, wherein,
the first and second bright field multi-color LEDs are each:
proximate to a center of the illumination module and adjacent to the close-up corrective lens that is positioned in the center of the illumination module, and
proximate to the first and second diffuser that diffuse light emitted by the first and the second bright field multi-color LED.

5. The indicia-reading apparatus according to claim 1, wherein the first and the second dark field multi-color LED provide a high incident angle light for the dark field illumination.

6. The indicia-reading apparatus according to claim 2, wherein the first and second bright field multi-color LEDs provide a low incident angle light and the first and second diffuser diffuses the bright field illumination.

7. The indicia-reading apparatus according to claim 1, wherein the close-up corrective lens provides imaging for near range reading.

8. The indicia-reading apparatus according to claim 1, wherein the illumination module comprises two aimer fold mirrors in proximity to the close-up corrective lens.

9. The indicia-reading apparatus according to claim 1, wherein the dark field multi-color LEDs and the bright field multi-color LEDs are programmable.

10. The indicia-reading apparatus according to claim 1, wherein, the mobile computer device is a smart mobile phone.

11. The indicia-reading apparatus according to claim 1, wherein, the indicia-reading apparatus reads direct product marking (DPM) type barcodes.

12. An illumination module, comprising:
a first and a second dark field multi-color LED for illuminating dark fields; and
a first and second end dark field light block;
a first and a second bright field multi-color LED for illuminating bright fields;
a close-up corrective lens;

wherein, the first and the second dark field multi-color LED provide high incidence angle dark field illumination, and wherein, the first and the second end dark field light block reduces illumination and reflection in the illumination module, wherein the first dark field multi-color LED and the first bright field multi-color LED mounted on a first LED module, and the second dark field multi-color LED and the second bright field multi-color LED mounted on a second LED module, and wherein, the first LED module is mounted on one side of the illumination module and the second LED module is mounted on another side of the illumination module, with the close-up corrective lens positioned between the first and second LED modules, and wherein, the first dark field multi-color LED and the first end dark field light block are proximate to one end of the illumination module, and the second dark field multi-color LED and the second end dark field light block are proximate to another end of the illumination module.

13. The illumination module according to claim 12, further comprising:
a first and second diffuser that are positioned to diffuse light emitted from the first and the second bright field multi-color LED, respectively
the close-up corrective lens positioned in a center of the illumination module, between the first and the second bright field multi-color LED,
wherein, the first and the second bright field multi-color LEDs provide a low incident angle light and the first and the second diffuser diffuse the bright field illumination.

14. The illumination module according to claim 13, comprising two aimer mirrors in proximity to the close-up corrective lens.

15. The illumination module according to claim 12, wherein, the illumination module is proximate to an image scanner module and the illumination module and image scanner module are integrated in a smart mobile phone.

16. The illumination module according to claim 12, wherein, imaging scanning includes scanning direct product marking (DPM) type barcodes.

17. A mobile data terminal, comprising:
an illumination module that provides dark field illumination and bright field illumination;
an image scanner module; and
a smart mobile phone,
wherein, the illumination module comprises:
a first and a second dark field multi-color LED to provide edge illumination sources for dark field illumination;
a first and second bright field multi-color LED to provide front illumination sources for bright field illumination,
a close-up corrective lens, the first dark field multi-color LED and the first bright field multi-color LED mounted on a first LED module, and the second dark field multi-color LED and the second bright field multi-color LED mounted on a second LED module, and wherein, the first LED module is mounted on one side of the illumination module and the second LED module is mounted on an other side of the illumination module, with the close-up corrective lens positioned between the first and second LED module, and wherein, the illumination module is proximate to the image scanner module and they are integrated in the smart mobile phone.

18. The mobile data terminal according to claim 17, wherein, the integration of the illumination module and the image scanner module supports thin mobile phone edge mount applications.

19. The mobile data terminal according to claim 17, wherein, the illumination module further comprises:
- a clear bezel to mechanically support components as well as optically support illumination, aimer, and lens functions,
- two light diffuser to improve uniformity of the front illumination, and
- two aimer fold mirrors to redirect an aimer beam.

* * * * *